US006967619B2

(12) United States Patent
Khoo et al.

(10) Patent No.: US 6,967,619 B2
(45) Date of Patent: Nov. 22, 2005

(54) LOW NOISE BLOCK

(75) Inventors: Tai Wee Khoo, Singapore (SG); Gregory C. Poe, Chepachet, RI (US)

(73) Assignee: KVH Industries, Inc., Middletown, RI (US)

( * ) Notice: Subject to any disclaimer, the term of this patent is extended or adjusted under 35 U.S.C. 154(b) by 0 days.

(21) Appl. No.: 10/753,711

(22) Filed: Jan. 8, 2004

(65) Prior Publication Data

US 2005/0151688 A1 Jul. 14, 2005

(51) Int. Cl.[7] ............................ H01Q 1/38; H04B 1/10
(52) U.S. Cl. ............................ 343/700 MS; 343/909; 343/840; 455/302; 455/307; 333/21
(58) Field of Search ............................ 333/21, 137, 113, 333/202; 343/700 MS, 909, 840; 455/302, 455/307, 327, 328

(56) References Cited

U.S. PATENT DOCUMENTS

| | | | | |
|---|---|---|---|---|
| 2,508,085 A | | 5/1950 | Alford | 250/33 |
| 4,370,657 A | | 1/1983 | Kaloi | 343/700 |
| 4,686,535 A | | 8/1987 | Lalezari | 343/700 |
| 4,853,657 A | | 8/1989 | Cruchon et al. | 333/137 |
| 5,008,681 A | | 4/1991 | Cavallaro et al. | 343/700 |
| 5,122,810 A | * | 6/1992 | Nisbet et al. | 343/756 |
| 5,166,693 A | | 11/1992 | Nishikawa et al. | 342/422 |
| 5,181,042 A | | 1/1993 | Kaise et al. | 343/700 |
| 5,210,542 A | | 5/1993 | Pett et al. | 343/700 |
| 5,220,335 A | | 6/1993 | Huang | 343/700 |
| 5,231,406 A | | 7/1993 | Sreenivas | 343/700 |
| 5,245,349 A | | 9/1993 | Harada | 343/700 |
| 5,382,959 A | | 1/1995 | Pett et al. | 343/700 |
| 5,384,557 A | | 1/1995 | Yoshida et al. | 333/21 A |
| 5,402,138 A | * | 3/1995 | Hulett et al. | 343/840 |
| 5,630,226 A | | 5/1997 | Kanda et al. | 455/313 |
| 5,801,599 A | | 9/1998 | Flynn et al. | 333/26 |
| 5,995,818 A | * | 11/1999 | Smith | 455/302 |
| 6,075,497 A | * | 6/2000 | Chen et al. | 343/840 |
| 6,122,482 A | | 9/2000 | Green, Sr. et al. | 455/3.2 |
| 6,188,367 B1 | | 2/2001 | Morrison et al. | 343/765 |
| 6,204,823 B1 | | 3/2001 | Spano et al. | 343/766 |
| 6,297,774 B1 | | 10/2001 | Chung | 343/700 |
| 6,334,045 B1 | | 12/2001 | Green, Sr. et al. | 455/3.02 |
| 6,344,832 B1 | * | 2/2002 | Lotfy | 343/786 |
| 6,396,440 B1 | | 5/2002 | Chen | 343/700 |
| 6,397,038 B1 | | 5/2002 | Green, Sr. et al. | 455/3.02 |
| 6,407,717 B2 | | 6/2002 | Killen et al. | 343/815 |
| 6,421,012 B1 | | 7/2002 | Heckaman | 343/700 |
| 6,424,817 B1 | | 7/2002 | Hadden et al. | 455/3.02 |

(Continued)

OTHER PUBLICATIONS

KVH Makes Satellite TV a Reality in Autos with Revolutionary Ultra-low Profile Antenna, Press Release, Jan. 9, 2003.

(Continued)

*Primary Examiner*—Tan Ho
(74) *Attorney, Agent, or Firm*—Foley Hoag, LLP

(57) ABSTRACT

Disclosed are methods, systems, and a device that includes an output for providing at least a first signal at a first frequency and a distinct second signal at a distinct second frequency, a first signal channel connected between a first waveguide port and the output, the first waveguide port providing a harmonic of the first signal, and, a distinct second signal channel connected between a second waveguide port and the output, the second waveguide port providing a harmonic of the second signal, where the first signal channel includes a notch filter centered substantially at the distinct second frequency, and the second signal channel includes a notch filter centered substantially at the first frequency.

23 Claims, 8 Drawing Sheets

STACKED LNB

U.S. PATENT DOCUMENTS

| | | | | |
|---|---|---|---|---|
| 6,445,359 | B1 * | 9/2002 | Ho | 343/840 |
| 6,452,550 | B1 | 9/2002 | Channabasappa et al. | 343/700 |
| 6,473,057 | B2 | 10/2002 | Monzon | 343/909 |
| 6,496,146 | B1 | 12/2002 | Chang et al. | 343/700 |
| 6,512,431 | B2 | 1/2003 | Pergande | 333/246 |
| 6,538,612 | B1 | 3/2003 | King | 343/757 |
| 6,628,230 | B2 * | 9/2003 | Mikami et al. | 342/175 |
| 6,710,749 | B2 | 3/2004 | King | 343/757 |
| 6,798,386 | B1 * | 9/2004 | Louzir | 343/840 |
| 6,864,846 | B2 | 3/2005 | King | 343/757 |
| 2001/0050654 | A1 | 12/2001 | Killen et al. | 343/817 |
| 2001/0055948 | A1 | 12/2001 | Ikeda et al. | 455/13.3 |
| 2002/0067311 | A1 | 6/2002 | Wildey et al. | 342/372 |
| 2002/0167449 | A1 | 11/2002 | Frazita et al. | 343/756 |
| 2003/0011514 | A1 | 1/2003 | Kirchofer et al. | 342/372 |
| 2003/0020663 | A1 | 1/2003 | Bolzer et al. | 343/770 |
| 2003/0060182 | A1 * | 3/2003 | Nibe | 455/323 |
| 2003/0194985 | A1 | 10/2003 | Nakamura | 455/323 |

OTHER PUBLICATIONS

Patricia A. Loth; "Recent Advances in Waveguide Hybrid Junctions*" IRE Transactions on Microwave Theory and Techniques, Oct. 1956, p268-271.

International Search Report of PCT/US04/00398 mailed May 16, 2005.

* cited by examiner

LOW NOISE BLOCK

CROSS-REFERENCE TO RELATED APPLICATIONS

This patent application is co-pending with a related patent application Ser. No. 10/753,716 entitled "Microstrip Transition and Network", filed this same day on Jan. 8, 2004, the contents of which are incorporated herein by reference in their entirety.

BACKGROUND

Antennas may stand alone, or may be mounted on, for example, moving vehicles and stationary objects including buildings. The height or the size of such antennas may be restricted based on legal, aesthetic, fuel efficiency, and/or other considerations. In some applications, a small footprint of an antenna may also be desirable. Antennas for mobile communications that rely on satellite broadcasted signals may include slotted antenna arrays and phased array antennas, and may be capable of elevation tracking, for example, to account for differences in arrival time of a signal, for example, so that rotation and/or tilting of the antenna may not, at least in part, be necessary. In certain applications, phased array antennas may include both microstrip antenna elements and waveguides. In a standard waveguide, the height of the waveguide can be one-half the width of the waveguide. A reduced height waveguide may have a height less than one-half the width.

Communications received and/or transmitted from antennas include circularly polarized signals. Television signals may be broadcast from multiple satellites co-located in geosynchronous orbit. These signals may accordingly be circularly polarized, with one set of signals being, for example, right-hand circularly polarized and the other left-hand circularly polarized, dual-elliptical polarizations, or linearly polarized.

SUMMARY

Disclosed is a method, system, and device that includes an output for providing at least a first output signal at a first frequency band and a distinct second output signal at a distinct second frequency band, a first signal channel connected between a first waveguide port and the output, the first waveguide port providing a first input signal upon which the first output signal is based, and, a distinct second signal channel connected between a second waveguide port and the output, the second waveguide port providing a second input signal upon which the second output signal is based, where the first signal channel includes a notch filter centered substantially at about the distinct second frequency band, and the second signal channel includes a notch filter centered substantially at about the first frequency band.

In one embodiment, the first signal channel can include a first mixer, where the first mixer can be coupled to a first local oscillator and the first input signal. Further, the distinct second signal channel can include a distinct second mixer, the distinct second mixer coupled to a distinct second local oscillator and the distinct second input signal.

The disclosed device can include an impedance transformer coupled to the output. In one embodiment, the first output signal can include a maximum peak signal at a frequency in a range substantially between about 950 MHz to about 1450 MHz, and the distinct second output signal can include a maximum peak signal at a frequency in a range substantially between about 1525 MHz to about 2025 MHz.

In an embodiment, the at least one of the first waveguide port and the second waveguide port can be rectangular, although other waveguide shapes are permissible. Further, the output can include a coaxial cable or another common output.

In some embodiments, the first input signal can represent a right-hand polarized signal, and the distinct second input signal can represent a left-hand polarized signal. Similarly, in some embodiments, the first input signal can represent a left-hand polarized signal, and the distinct second signal can represent a right-hand polarized signal. Other signals of other polarizations can be used.

The first signal channel can also include at least one first low pass filter coupled to the output of the first mixer, and the distinct second signal channel can also include at least one second low pass filter coupled to the output of the distinct second mixer. One or more IF amplifiers can be coupled to the one or more first low pass filters, and one or more second IF amplifiers can be coupled to the one or more second low pass filters.

The disclosed device can include a first band-pass filter coupled between the first input signal and the first mixer, and a second band-pass filter coupled between the distinct second input signal and the distinct second mixer. The disclosed device can also include a first band-pass filter coupled between the first local oscillator and the first mixer, and a second band-pass filter coupled between the distinct second local oscillator and the distinct second mixer.

In one embodiment, the first waveguide port and the distinct second waveguide port can be coupled to a housing, where the housing can include chamfered edges. As provided herein, such chamfered edges can facilitate a low profile LNB where reduced space may be available to accommodate the tilting of the antenna/waveguide.

The first waveguide port can include a first waveguide port probe, where such first waveguide port probe can be positioned to be a distance from an end of a waveguide of approximately one-quarter wavelength of the first input frequency. Further, the second waveguide port can include a second waveguide port probe, where the second waveguide port probe can be positioned to be a distance from an end of a waveguide of approximately one-quarter wavelength of the distinct second input frequency.

In one embodiment, the first output signal can be approximately within a range of about 950 MHz to about 1450 MHz, and the distinct second output signal can be approximately within a range of about 1525 MHz to about 2025 MHz. Similarly, the distinct second output signal can be approximately within a range of about 950 MHz to about 1450 MHz, and the first output signal can be approximately within a range of about 1525 MHz to about 2025 MHz. Further, in an embodiment, the first input signal can include an approximate frequency range of about 12.2 GHz to about 12.7 GHz, and, the distinct second input signal can include an approximate frequency range of about 12.2 GHz to about 12.7 GHz. In one such embodiment, the first local oscillator can be tuned to a frequency of about 10.675 GHz, and the distinct second local oscillator can be tuned to a frequency of about 11.250 GHz. Similarly, the distinct second local oscillator can be tuned to a frequency of about 10.675 GHz, and the first local oscillator can be tuned to a frequency of about 11.250 GHz. Accordingly, in some embodiments, the first output signal is an Intermediate Frequency (IF) of the first input signal, and/or the distinct second output signal is an Intermediate Frequency (IF) of the distinct second input signal.

BRIEF DESCRIPTION OF THE DRAWINGS

These and other features and advantages of the antennas, systems, devices, and processes disclosed herein will be more fully understood by reference to the following illustrative, non-limiting detailed description in conjunction with the attached drawings in which like reference numerals refer to like elements throughout the different views. The drawings illustrate principals of antennas, systems and processes disclosed herein and, although not to scale, may show relative dimensions.

DETAILED DESCRIPTION

Figure 1:
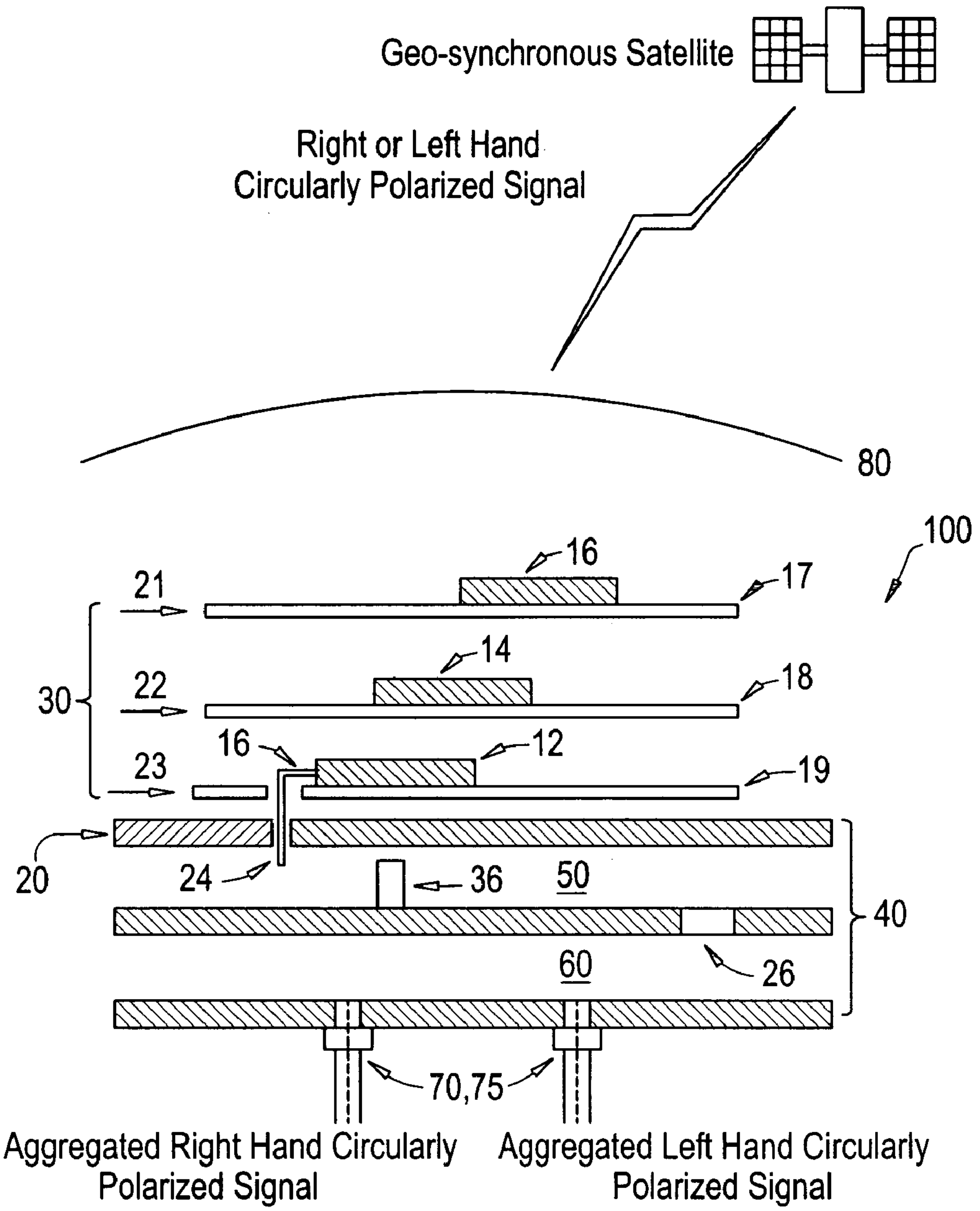
FIG. 1 is a schematic representation of a microstrip waveguide combiner antenna.

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the systems and methods described herein.

Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless otherwise specified, can be altered without affecting the scope of the disclosed and exemplary systems or methods of the present disclosure.

For convenience, before further description of the present disclosure, certain terms employed in the specification, examples and appended claims are collected here. These definitions should be read in light of the remainder of the disclosure and understood as by a person of skill in the art. Unless defined otherwise, technical and scientific terms used herein have the same meaning as commonly understood by a person of ordinary skill in the art.

The articles "a" and "an" are used herein to refer to one or to more than one (i.e., to at least one) of the grammatical object of the article. By way of example, "an element" means one element or more than one element.

The terms "comprise" and "comprising" are used in the inclusive, open sense, meaning that additional elements may be included.

The term "including" is used to mean "including but not limited to". "Including" and "including but not limited to" are used interchangeably.

Unless otherwise stated, use of the word "substantially" can be construed to include a precise relationship, condition, arrangement, orientation, and/or other characteristic, and deviations thereof as understood by one of ordinary skill in the art, to the extent that such deviations do not materially affect the disclosed methods and systems.

An "antenna" includes a structure or device that may be used, at least in part, to collect, radiate, and/or transmit, electromagnetic waves.

An "antenna array" includes an assembly of antenna elements with dimensions, spacing, and/or illumination sequence.

A "channel" includes a path provided by a transmission medium via either a physical separation and/or an electrical separation, such as for example, by frequency or time-division multiplexing.

A "port" refers to a point at which signals can enter or leave a device.

A "transmission medium" includes a material substance, such as a waveguide, for example a dielectric-slab waveguide, fiber-optic cable, twisted-wire pair, coaxial cable, water, and air, that can be used for the propagation of signals, for example, in the form of modulated radio, light, or acoustic signals and/or waves, from one point to another. Free space can also be considered a transmission medium. Such examples are provided for illustration and not limitation.

A "transmission line" refers to a medium or structure that forms all or part of a path from one place to another for directing the transmission of energy, for example, electric currents, magnetic fields, acoustic waves, or electromagnetic waves. Examples of transmission lines include wires, optical fibers, coaxial cables, closed waveguides and dielectric slabs.

A "waveguide" includes a material, device, or transmission path along which a signal propagates, that confines and guides a propagating electromagnetic wave or signal.

In some embodiments, the antenna disclosed herein is a low profile phased array antenna system that, at least in part, may be pivotable in azimuth and elevation to receive satellite signals. These satellite signals may correspond to, for example, television, music, and/or Internet related data. The antenna may be mounted on a vehicle, house or other stationary or moving object. The antenna may receive geostationary satellite signals regardless of whether the object or vehicle on which the antenna is mounted is in motion or stationary. In some embodiments, the antenna of the present disclosure is mounted on a moving vehicle, for example, an automobile.

This disclosure is directed, at least in part, to antennas, waveguides, and methods and devices for receiving and/or transmitting signals and combining received or transmitted signals. The antennas of this disclosure may include, in some embodiments, a phased array, or microstrip network, that includes a plurality of microstrip patch elements that can include several hundred microstrip patch elements. In some embodiments, the antenna may include a three-dimensional array of microstrip patch elements. In one embodiment, microstrip patch elements may be positioned on one or more substantially parallel dielectric substrates above a ground plane, to receive circularly polarized electromagnetic energy transmitted by a geo-stationary satellite. A ground plane can include a substantially conductive material that can include metal.

The electromagnetic signals received by a plurality of individual microstrip patch elements may be combined by microstrip transmission lines between two or more microstrip patch elements. Microstrip patch elements may include metallic elements that may be formed, at least in part, on a dielectric substrate.

In one example embodiment, a geo-stationary satellite may transmit right and/or left-hand circularly polarized signals (referred to herein as RHC signals and LHC signals, respectively) that penetrate a radome of an antenna according to the disclosed methods and systems. In some embodiments, the radome exhibits a thickness equal to about one-half wavelength of a transmitted signal. In other embodiments, the radome thickness is selected as a multiple of the wavelength of the transmitted signal. The antenna may have a thickness of about 4.5 inches.

Accordingly, an antenna of the present disclosure may include a microstrip network and a waveguide combiner and/or transmission line, with one or more three port junctions, or a plurality of three port junctions, extending from the microstrip network into the waveguide combiner or transmission line. For example, electromagnetic signals may be additionally, or separately, combined by a waveguide combiner. Combined signals may form one or more right-hand and/or left-hand circularly polarized signals. The waveguide combiner may include at least one or more independent waveguide assemblies. The combined signal provided by the antenna system disclosed herein may be transmitted to one or more receivers that may extract data (e.g. television, music, and/or Internet related data) for subsequent communication to a user via an interface device, for example, a video screen, computer screen, or speaker. Accordingly, the methods and systems are not limited by a data format, modulation scheme, protocol, encoding scheme, or other act of data manipulation.

FIG. 1 shows a cross-sectional view of an exemplary antenna 100, with a sample radome 80. It can be understood that the disclosed antennas and devices may operate in a transmitting and/or a receiving mode. As the FIG. 1 embodiment indicates, the antenna 100 may be formed by a microstrip network 30 that includes at least one array, and in the FIG. 1 embodiment, includes three arrays 21, 22, 23. For the FIG. 1 embodiment, the arrays 21, 22, 23 can be understood to be arranged on substantially parallel support sheets and/or dielectric substrates 17, 18, 19, where the substantially parallel substrates 17,18, 19 are positioned between a ground plane 20 and the radome 80 and/or transmission medium. The arrays can be arranged on each of the substrates 17, 18, 19 to provide columns and rows of microstrip antenna elements 12, 14, 16, although such arrangement is for convenience, and other arrangements are contemplated. Additionally and/or optionally, microstrip antenna network or array 30 or array 23 may include arrays disclosed in commonly owned pending patent applications U.S. Ser. No. 10/290,667 and U.S. Ser. No. 10/290,666, both with a filing date of Nov. 8, 2002 and both hereby incorporated by reference in their entirety.

For the illustrative FIG. 1 embodiment that includes three layers 21, 22, 23 of microstrip elements 16, 14, 12, microstrip elements 13, 14 on the second and third layers 22, 21 (e.g., two layers closest to the radome) can be understood to be parasitic antenna elements, or elements without a feed, while microstrip antenna elements 12 on the first microstrip layer 23 can be understood to be driven elements. As shown in the example FIG. 1 embodiment, a driven patch element 12 can be understood to be associated with and/or correspond to two parasitic patch elements 14, 16 that are located on the aforementioned second and third substrate layers 22, 21, where such corresponding patch elements 14, 16 can be arranged substantially parallel and above, but offset from, the corresponding driven patch element 12. The various microstrip elements 12, 14, 16 can include and/or otherwise be comprised of a conducting material such as a metal or metal alloy, or another material as known in the art.

Accordingly, an antenna according to the disclosed embodiment may tilt and/or rotate to acquire/receive a signal from a signal source, and/or to transmit a signal to a signal receiver. In one example receiving embodiment, in response to received electromagnetic energy received, electromagnetic energy received on the microstrip patch elements 12, 14, 16 can be electromagnetically coupled to corresponding microstrip patch elements 12 (referred to herein as "driven patch elements") on the dielectric substrate 23 closest to the ground plane 20 such that an electric current can flow on, from, and/or through the driven patch element 12. Accordingly, the electric current associated with the driven patch element 12 can be based on electromagnetically coupled energy received from corresponding parasitic patch elements 14, 16. Such electric current can then be combined with other current received and/or generated by another number, e.g., five or seven, of other driven patch elements (and corresponding parasitic patch elements), where such combination can be performed at a common collection point.

To ensure that the various signals substantially constructively combine at the common collection point, the associated driven patch elements 12 can be rotated relative to each other and can be interconnected by predetermined lengths of microstrip transmission lines such that the phase signals from driven patch elements 12 associated with a common collection point are substantially in-phase when they arrive at the common collection point such as to provide a substantially constructive combination. It may be noted that because of the aforementioned optional row and column arrangement of microstrip elements 12, 14, 16 on a given dielectric substrate 17, 18, 19, when considering the driven elements 12 and the associated collection points, the microstrip network can be understood to further include a plurality of collection points that can be arranged in a similar two dimensional, or column/row configuration.

Referring to FIG. 1, at least one probe 24 can extend from the microstrip network, at a common collection point, or feedpoint, into a transmission line 50 through one or more openings in a ground plane 20. Transmission line 50 may be a waveguide, or part of a waveguide combiner assembly 40. The width of the transmission line may be about one-half the wavelength of the transmitted or received signal.

In some embodiments, there may be a plurality of probes, corresponding to a plurality of collection points, that extend from the microstrip network 30 through an opening or openings in the ground plane 20 into transmission lines 50. For example, a column or row of probes can extend from a column or row of collection or feed points on a microstrip array. Probe 24 may couple and/or connect the microstrip network to a transmission line or waveguide assembly such that probe 24 may provide a physical and/or an electrical connection between the network and assembly, such that the transmission line and/or waveguide assembly may receive or transmit signals to or from the microstrip network.

A first level of combiner assembly 40 may be a transmission line 50, such as a rectangular waveguide assembly. In one embodiment, a transmission line and/or waveguide assembly 50 can be an azimuthal combiner. A waveguide assembly 50, for example, may include one or more channels, and may comprise one or more perturbations, for example, physical perturbations 36 that can contribute to the directivity of the signal in the waveguide, and impedance matching, where the shape and/or position can be selected based on a waveguide width ratio, a receiving frequency (range) of interest, and/or characteristic impedance. Accordingly, the physical perturbation shape and spacing from a probe 24 can be selected to provide a desired and/or selected directivity and/or impedance. For example, in some embodiments, the physical perturbations can includes shapes and/structures that can include a post, a ridge, a cylinder, a cleft, a cube, an iris, a change in width of a transmission line, a change in transmission line dimension (e.g., waveguide width/height) or another shape or other alternation of physical dimension, with such examples provided for illustration and not limitation.

Accordingly, based on the embodiment and the number of probe 24, a waveguide combiner assembly can include multiple physical perturbations 36 that can be in a one-to-one relationship with respect to probe 24, or another ratio, depending upon the embodiment and selected waveguide and/or signal propagation characteristics. Referring again to FIG. 1, the waveguide assembly 40 includes at least one perturbation 36 that is physically offset from a probe 24. A perturbation 36 may be positioned at a distance from a vertical wall of a waveguide assembly, and in one embodiment, a perturbation 36 may optionally be positioned at least about one-quarter signal wavelength from a vertical wall of a waveguide assembly. As provided herein, other perturbations can be used in other embodiments. Further, the height of the perturbation may be selected based on the height of the waveguide.

Accordingly, it can be understood that the combination of probe 24 and physical perturbation 36 can define a coupler for coupling a signal amongst, for example, a microstrip antenna array 30 and a transmission line or waveguide combiner assembly 40. The coupler can be understood to include three ports, where in a receiving mode, a coupler can include two input ports and one output port, while in a transmission mode, a coupler can be understood to include one input port and two output ports. Based on the illustrated assembly of FIG. 1, for example, in a receiving configuration with the probe 24 and perturbation 36 defining a coupler, a received signal from the post can be coupled to the waveguide and provided directivity to travel along the waveguide in a first direction, while also being substantially constructively combined with other signals already in the waveguide/transmission line and also propagating in the first direction. The combined "output" signal thus provides the output "port" of the coupler, with the input "ports" being the probe signal and the existing waveguide signal propagating in the first direction.

With regard to a transmitting mode, for example, a signal propagating in a second direction along the waveguide (e.g., the second direction being opposite to the first, receive direction) may encounter the aforementioned coupler defined by a probe 24 and physical perturbation 36, thus providing an input to the coupler. As provided previously herein, the physical characteristics of the physical perturbation 36 can be selected for directivity and/or impedance matching/mismatching to allow, for example, the input signal to be propagated in the second direction and/or to the probe 24. The ratio of signal directed to the probe 24 and in the second direction (e.g., further propagating in the second direction in the waveguide) can be determined by the embodiment and the selection of the physical perturbation 36 characteristics. Accordingly, it can be understood that in this aforementioned transmission example, the "coupler" defined by the probe 24 and physical perturbation 36 includes one input port and two output ports.

In one embodiment such as the embodiment shown in FIG. 1, the combiner assembly 40 can include successive layered waveguide sections. The second level waveguide assembly 60 may be separated from the first level waveguide assembly or transmission line by a support sheet 41. In an embodiment, a second waveguide assembly 60 may include a shape that may, at least in part, compensate a signal for elevation time delays that may be due, at least in part, to a tilt of the antenna that may cause one part of the antenna to receive a signal "earlier" in time relative to other parts of the antenna. For example, the second level waveguide assembly 60 can include an arced wall, where the arcs can have increased lengths to provide delays for signals that are received earlier than other signals, based on and/or to compensate for the tilt of the antenna. Accordingly, the second waveguide assembly 60 shape can include progressive lengths of waveguides to produce a specific time delay and/or time delay profile across the antenna.

The second waveguide level of a waveguide combiner 40 may further combine individual RHC/LHC row signals into a single RHC/LHC aggregate signal. The aggregate RHC/LHC signal can be subsequently transmitted from the antenna system 100 via at least one separate coaxial cables, 70, 75, or via waveguide ports. In illustrative FIG. 1, one coaxial cable 70 for aggregate RHC signal may be used and another coaxial cable 75 may be used for aggregate LHC signals.

Figure 2:
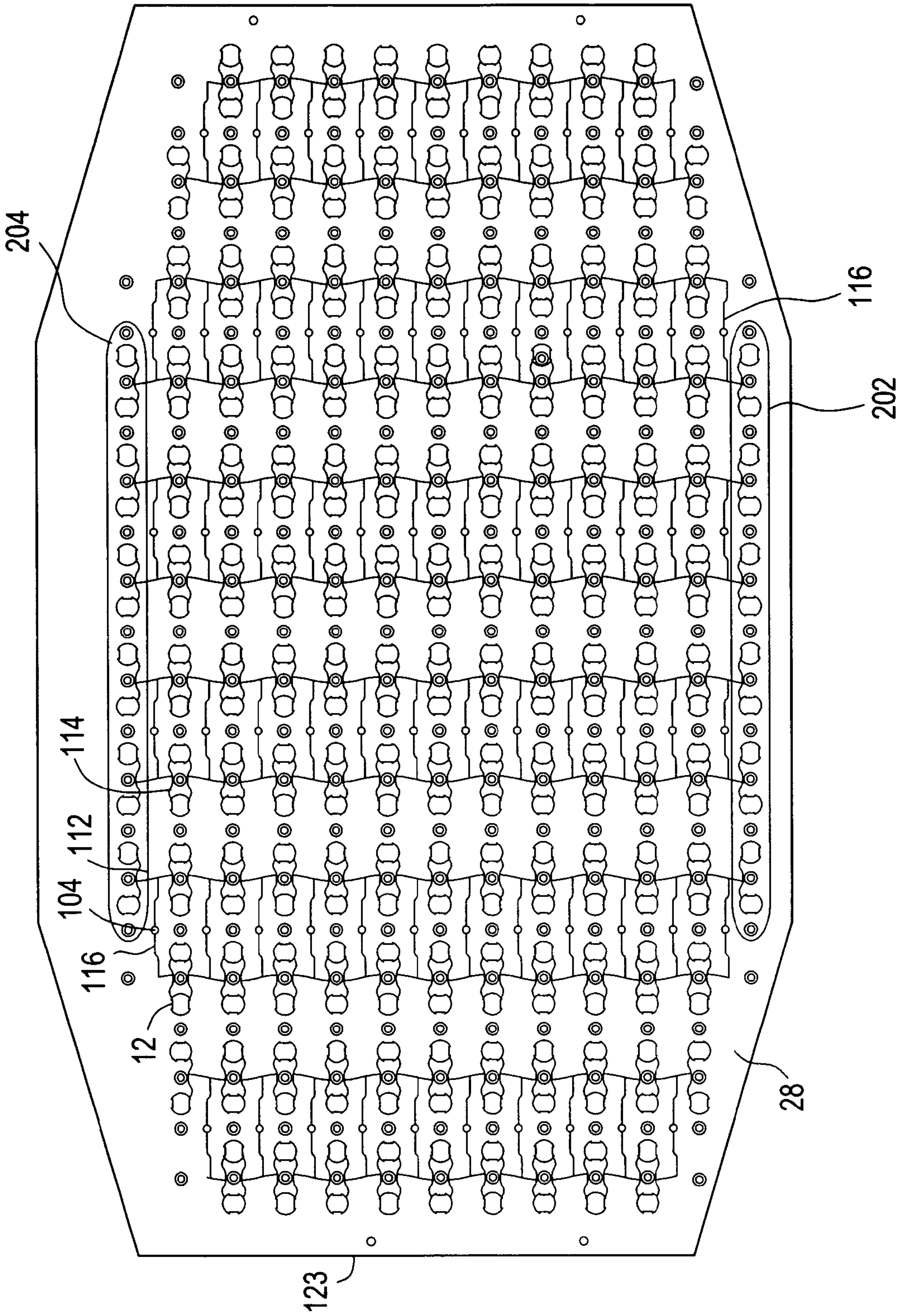
FIG. 2 is a representation of a microstrip antenna array.

FIG. 2 illustrates one arrangement 123 of the driven elements, feed points, microstrip transmission lines and collection points on the lowest substrate 19. Elements 12 can be connected by feed lines 114 to feed points 112, with one feed point 112 connected to a number of elements 12. Elements 12 may be connected by two feed lines 114 that can be connected to two feed points 112. For example, the feed points 112 may be arranged in rows adjacent to the rows of elements 12.

In the exemplary embodiment of FIG. 2, the antenna system includes sixty-eight groupings of patch elements with sixty-eight corresponding common collection points. In the FIG. 2 embodiment, there are two hundred and eighty driven patch elements that form these groupings. The interconnecting microstrip transmission lines and collection points may be located in substantially the same plane as that of the dielectric substrate that may support the array 123.

Referring to FIG. 2, two rows 202, 204 of the driven patch element array have a single feed point to which a microstrip transmission line 116 connects, while driven patch elements in other rows of the FIG. 2 array have two feed points to which microstrip transmission lines connect. For the two-feed-point patch elements, a first feed point is disposed to collect current induced by a RHC polarized signal that is incident on the element, while a second feed point is disposed to collect current induced by a LHC polarized incident signal. On the aforementioned patch elements that have a single feed point, the point is located to collect the current induced by either a RHC or a LHC polarized incident signal, but not both. Accordingly, signals collected by the microstrip transmission lines at the patch element feed points are substantially constructively combined such that signals from six or eight driven patch elements can be combined at a common collection point 104. Those of ordinary skill will understand that other numbers of combined signals can be provided. Accordingly, the FIG. 2 transmission lines are configured such that signals from feed points where LHC polarized signals are to be collected are combined only with LHC signals from other such feed points, while signals from feed points intended to collect RHC polarized signals are combined only with RHC signals from other such feed points. With reference to FIG. 1, FIG. 2 illustrates the overall arrangement of the driven elements, feed points, microstrip transmission lines and collection points on the substrate 23 of the microstrip network 30 that is furthest from the radome (e.g., closest to the waveguide assembly 40).

Figure 3:
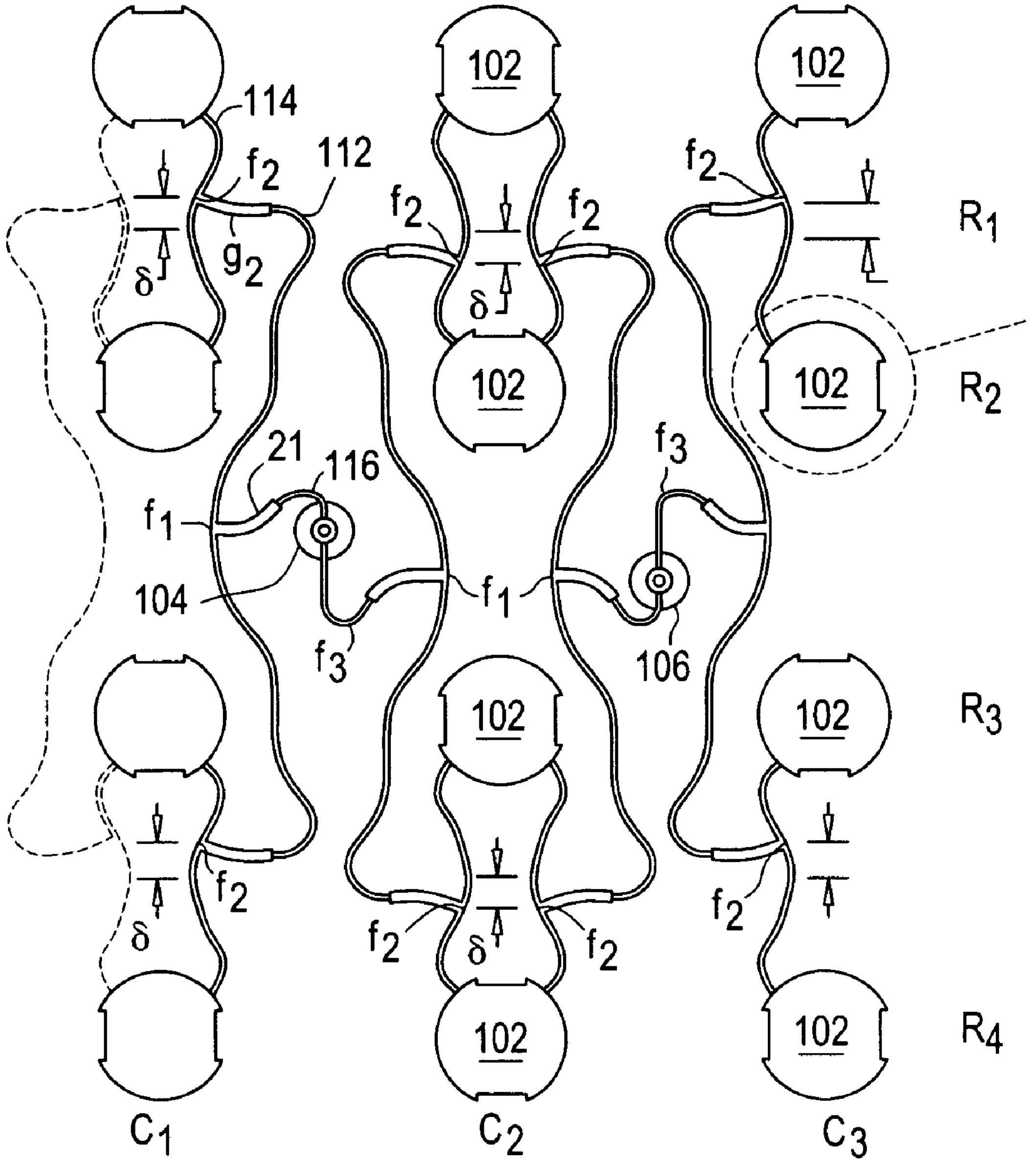
FIG. 3 is a top view of a subset of patch antenna elements illustrating a portion of the network.

FIG. 3 shows a representative subset of microstrip array 23. Elements 102 having feed point or collection point 104 may receive RHC polarized signals and elements 102 having feed point or collection point 106 may receive LHC polarized signals. It is noted that in a transmission mode, elements 102 between common feeds or collection points 104 and 106, i.e. elements of the column of elements designated $C_2$ in FIG. 3, may receive RHC or LHC polarized signals depending on whether the signal is received through collection point 104 or collection point 106, respectively.

In a receive mode, and with reference to collection point 104, the signals from element 102 at row $R_1$, column $C_1$ (1,1), and from element 102 at row $R_3$, column $C_1$ (3,1) can be in phase as they may have substantially equal feed lengths and orientation, the feed being from element 102 to $f_2$, to $f_1$, and to collection points 104. The longer feed length from elements (2,1) and (4,1), as shown by offsets δ, can result in a 90° phase shift for the signals from elements (2,1) and (4,1) relative to the signals from elements (1,1) and (3,1). However, the 90° rotation of elements (2,1) and (4,1) with respect to elements (1,1) and (3,1) can result in the signals from the elements of column $C_1$ being in phase with one another with respect to collection points 104.

As FIG. 3 also illustrates, the geometry and/or linewidth of transmission line feeds 112, 116 can be varied to provide the aforementioned combination of impedance and directivity described relative to the waveguide/transmission line assembly 40. As shown in FIG. 3, the linewidth at perturbations g2 and g1 can be larger, for example, to match the impedance of, and/or direct the signal from element 102 to *f*2 and then from *f*2 to *f*1 to collection point 104. By way of analogy, the linewidth configuration (e.g., variations in linewidth, size of linewidth, and other physical variations of linewidth) can be understood to be comparable and/or analogous to the physical perturbation 36 of the coupler (e.g., probe 24 and physical perturbation/post 36) described previously herein.

Figure 4:
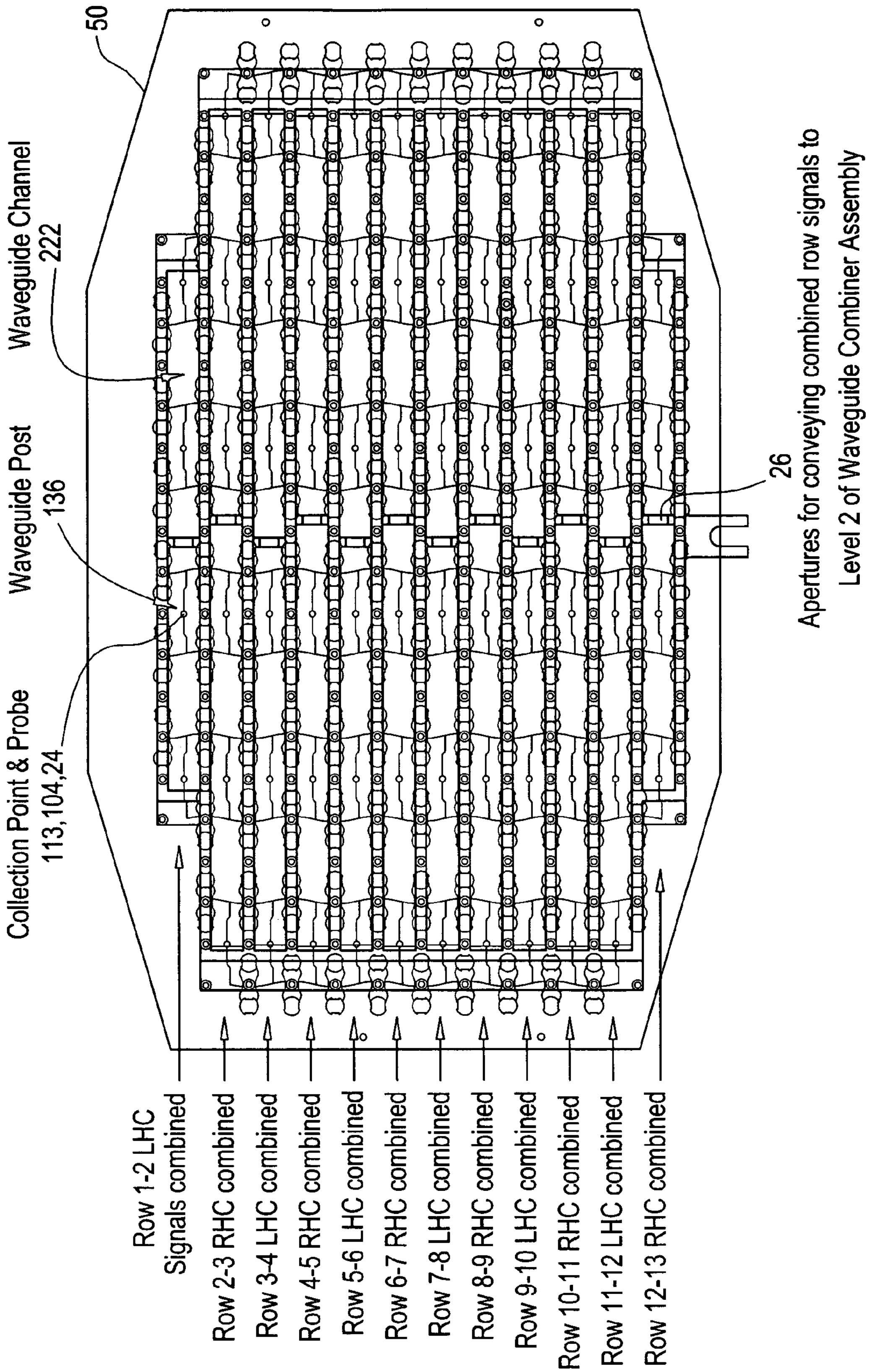
FIG. 4 represents a first waveguide that may be included in a waveguide combiner assembly.

FIG. 4 shows a first level waveguide 50 of the waveguide combiner assembly 40 (FIG. 1) superimposed on driven patch elements 12 to illustrate that one embodiment of a waveguide 50 may include a number of transmission lines and/or waveguide channels 222 that correspond with a plurality of feed points 104 and/or collection points 113. For example, a waveguide channel 222 may correspond to a row of collection points 104. It can be understood that other embodiments having differing numbers of waveguides 222 that may to correspond with differing numbers of rows of collection points 104 may be contemplated. FIG. 4 also shows a first junction 126 which may be an aperture for conveying combined signals to another level of the waveguide combiner assembly. As previously provided herein, in the illustrated embodiment, where collection points are configured for alternating rows of (collection points collecting) RHC and LHC combined signals, junction 26 and other junctions aligned (e.g., FIG. 4 column) with junction 26 may be reserved for one of LHC or RHC signal types, while other junctions not so aligned but illustrated in FIG. 4, may be reserved for the alternate signal type.

The one or more waveguide channels and/or transmission lines 222 may be reduced height rectangular waveguides. Reduced height waveguides may have a height b that can be less than, or equal to, half the width of the waveguide. Alternatively, waveguide channel 222 may be another known waveguide channel or waveguide. Waveguide channels 222 may differ and/or be the same waveguide or transmission line.

As provided previously herein, FIG. 4 illustrates part of waveguide assembly where each of sixty-eight common collection points 104 are coupled to individual probes 24 that extend through openings in a ground plane into a first level of a two level waveguide combiner assembly. Probes 24 may be, in an exemplary embodiment, laterally centered in waveguide 222 for ease of fabrication. The signal transition from microstrip array to waveguide assembly may result in an amplitude taper of the signal. As the example embodiment of FIG. 4 illustrates, each waveguide channel 222 corresponds to two rows of the microstrip array, but one row of collection/feed points which, in receive mode, combines either the LHC signals or the RHC signals of the two rows.

Figure 5:
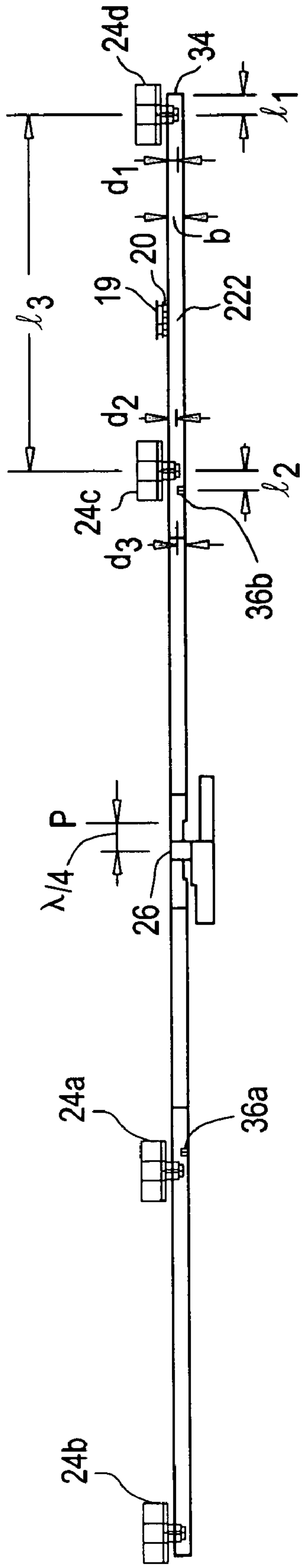
FIG. 5 is a partial cross sectional view showing a three port junction in a microstrip to waveguide transition.

Referring to FIG. 5, which shows a cross-sectional view of a microstrip network and transmission line or waveguide combiner assembly transition, microstrip array 23 can be disposed on a dielectric sheet 19 that can be disposed on a surface of a ground plane 20. The bottom surface of ground plane 20 may form a wall of a waveguide assembly 40 that comprises one or more waveguides 222 beneath ground plane 20.

As shown in FIG. 5, at least one probe 24*a–b* can extend from the microstrip network into a waveguide 222. In some embodiments, at least one probe 24*a–b* extends into at least one of waveguides 222. A probe 24 may include a pin and optionally a spacer and/or insulator that can be configured circumferentially around a pin. Such a spacer and/or insulator may include a fluoropolymer such as Teflon®, or another material.

As provided previously herein, a probe 24*a–d* and physical perturbation 36*a–b* may allow formation of a conjugate field that may bias a field in a particular direction, and/or provide an impedance to match a characteristic impedance of the transmission line/waveguide. As also provided previously herein, probe 24*a–d* and perturbation 36*a–b* may form a multiport coupler between the microstrip network and the waveguide. As indicated previously herein, probe 24*a–d* may comprise a first input port, while the combination of probe and physical perturbation 36*a–b* may bias a signal to create a second input port and an output port in a portion of the waveguide 222. For example, referring to FIG. 5, a second port may be created to the left of a probe 24*a–d*, away from the corresponding physical perturbation 36*a–b*, and a third port may be created to the right of a probe 24*a–d*, towards the corresponding physical perturbation 36*a–b*. The perturbation 36*a–b* may be disposed such that the impedance of the microstrip array and the waveguide assembly is substantially matched. Further, the probe 24*a–d* and physical perturbation 36*a–b* may be disposed relative to each other such that there is substantially limited insertion loss. In one embodiment, the waveguide combiner assembly can include a number of perturbations 36*a–b* that correspond to the number of probes 24*a–d*.

Accordingly, physical perturbation 36*b* can be spaced a distance 12 from probe 24*c* in a direction towards a first junction 26 in the first waveguide assembly. Physical perturbation 36*b* may extend into waveguide 222 a distance d3 from a side of waveguide 222 opposite that of probe 24*c*.

For the exemplary embodiment illustrated in FIG. 5, individual signals for particular rows of the waveguide assembly 50 can then transmitted to a second level of waveguide combiner assembly 60 via at least one first junction 26.

The first junction 26 can be located between the two central probes, designated in FIG. 5 as probes 24*a,c*, with the two probes furthest from e-plane junction 26 being designated as probes 24*b,d*. The first junction 26 may allow for a substantially smooth change in the direction of the axis of the waveguides, throughout which the axis remains substantially in a plane parallel to the direction of electric E-field (transverse) polarization. For example, first junction 26 may introduce a 180° phase shift between signals reaching a junction from opposite sides of first junction 26, i.e., from the left and right sides in relation to the orientation of FIG. 5. A first junction 26 can receive signals from both left and right sides (in relation to the orientation of FIG. 5) of waveguide 222. First junction 26 may direct signals from waveguide 222 into a feed waveguide located below waveguide 222. Further, probes 24*a–d* may be present on both sides of a first junction, or on one side of a first junction.

Signals from opposite directions arriving at first junction 26 in phase may cancel upon entering the first junction 26. To reduce the likelihood of signal cancellation, for example, first junction 26 can be offset from the mid-point p between the probes by a distance corresponding to about a quarter of a wavelength, λ/4. Signals from one set of probes 24*a*, 24*b*, for example, to the illustrated left of the first junction 126 in FIG. 5, can arrive at first junction 126 180° out of phase from signals from the other set of probes 24*c*, 24*c*, for example, to the illustrated right of first junction 126 in FIG. 5, so as to combine the signals from the two sets of probes 24*a–d* at e-phase junction 26.

The antennas of the present disclosure may be configured in a receive mode of operation, for example, when antenna 10 may be receiving signals from a source. Alternatively, the antennas of the present disclosure may be transmitting signals. In some embodiments, an antenna may be operated in a transmit mode where power from a first junction 26 to one set of probes 24*a–b*, 24*c–d* may be 180° out of phase from power to the other set of probes 24*a–b*, 24*c–d*. In the known manner described, an about λ/4 offset from a midpoint between a probe and the first junction may compensate for the phase difference introduced by the first junction 26, such that power to the set of probes 24*a–b*, 24*c–d* to either side of first junction 26 may be in phase.

Figure 6:
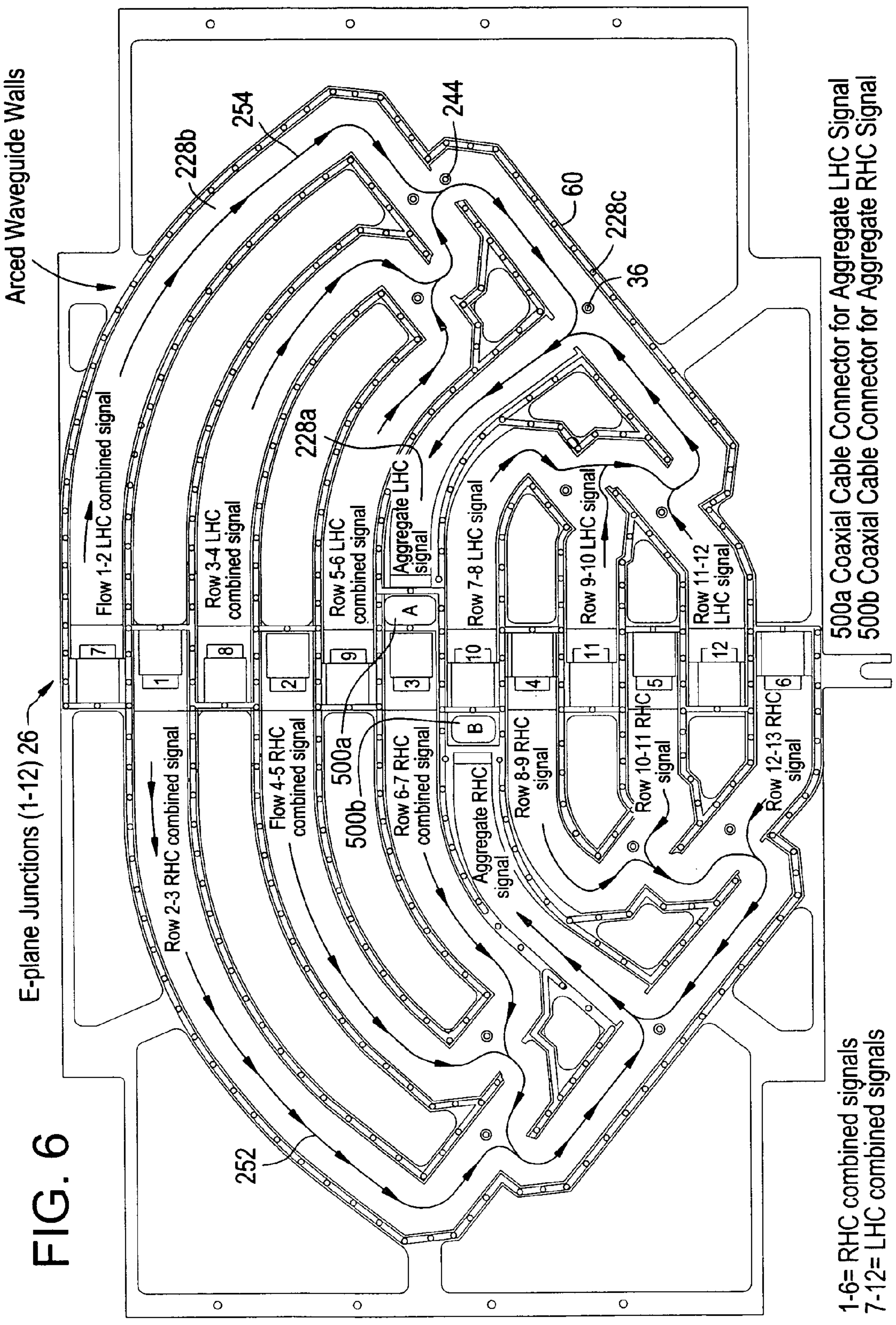
FIG. 6 represents a second waveguide that may be included in a waveguide combiner assembly.

FIG. 6 illustrates a fan shaped second waveguide assembly 60. For the illustrated embodiments, signals from waveguide 50 can enter second waveguide assembly 60 through at least one first junction 26 (e.g., twelve junctions as illustrated in the example embodiment of FIG. 6, corresponding to rows of first waveguide assembly 50 as designated in FIG. 6). Waveguide assembly 60 may have a number of branches 228*b* to correspond to the number of waveguides 222. In some embodiments, at least one second junction 244 may be located at the ends of branches 228*b*. Second junction 244 may be formed by a physical perturbation as previously provided herein. Second junction 244 may act to combine and/or aggregate signals from two or more branches 228*b* (e.g., Row 1-2 LHC combined signal with Row 3-4 LHC combined signal with Row 5-6 LHC combined signal) into combined branches 228*c*.

Second junction 244 may allow for a substantially smooth change in the direction of the axis of a waveguide, for example, waveguide 228*b*, throughout which the axis remains in a plane substantially parallel to the direction of magnetic H-field (transverse) polarization. Second junction 244 may include a reduced width section. Additional junctions may include at least one physical perturbation 36, which may be grounded. Such a physical perturbation 36 may, at least in part, determine a power split. In an embodiment, a second junction may be a three port junction which may combine signals at a predetermined power ratio.

In some embodiments, a waveguide 60 may comprise a multiple, or a plurality of second junctions or three port junctions 244. Additional second junctions may be provided to successively combine signals until signals from the branches 228*b* may be combined into one signal propagating in a major branch 228*d*.

For example, combined and/or aggregated signals may propagate through combined branches 228*c* of feed waveguide 60. In one embodiment, signals may exit major branches 228*d* at slots 500*a–b*. In an embodiment, wedges 48 at the ends of major branches 228*d* may bend and/or direct the propagation path about 90° such that signals may exit major branches 228*d* at slots 500. In an exemplary embodiment, the second waveguide assembly 60 may include one or more slots 500*a–b*.

Antenna 100 may be so configured as to receive signals with different polarizations, and antenna 100 may separate the signals by polarization, such that each radiation waveguide channel 228 may receive signals of one polarization.

In some embodiments, the polarizations in the radiation waveguides 228 alternate, that is, adjacent radiation waveguides 228 may contain signals having substantially mutually orthogonal polarizations. For example, FIG. 6 depicts a first and second polarizations designated as arrows 252 and 254, respectively. Referring to exemplary FIG. 6, the waveguide assembly can be configured to direct first polarization signals to the left and second polarization signals to the right. Signals exiting slot 500*a* may comprise substantially first polarization signals 252 and signals exiting slot 500*b* thus may comprise substantially second polarization signals 254.

In some embodiments, waveguide assembly 60 provides for signals such that phases of signals propagating in waveguides 228 may be out of phase. For second junctions 244 to combine the signals, second junctions 244 may require the signals arriving at the junctions to be in phase. Lengths of waveguides 228 may be adjusted such that signals, for example, in branches 228*b* may be substantially in phase at the appropriate second junction 244.

Physical perturbations 36 may extend into a second waveguide assembly 60 to provide further attachment of first waveguide assembly 50 to waveguide assembly 60. In some embodiments, this attachment may reduce signal leakage.

The second waveguide assembly may be positioned to be in operable communication with the first waveguide assembly such that a distance from a signal path in the second waveguide assembly in relation to the top of the first waveguide assembly establishes an evanescent-mode of signal propagation.

Figure 7A:
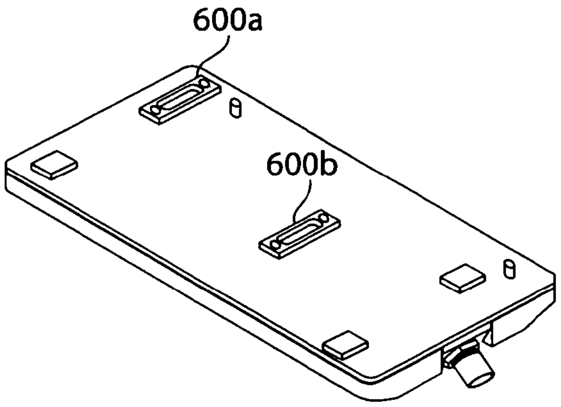
FIGS. 7A–C show three views of a low noise block device that includes a housing with chamfered edges; and, FIG. 8 represents a schematic of an exemplary stacked low noise block.
Figure 7B:
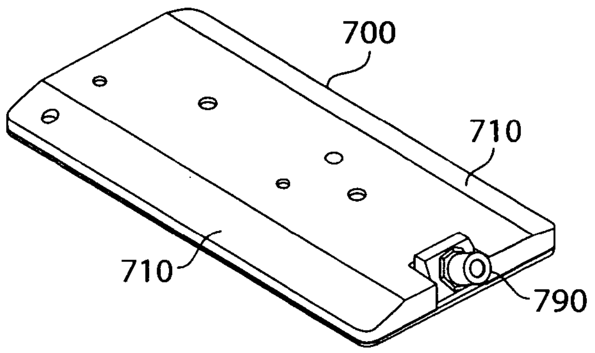
Figure 7C:
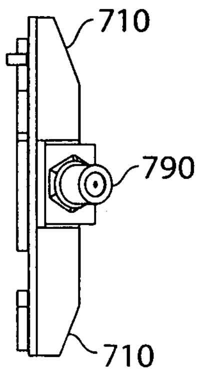

Signals exiting slots 500*a–b* may be configured to communicate with a stacked low noise block. One embodiment of a stacked low noise block (LNB) can include a housing which can further include interfaces 600*a–b* to the slots 500*a–b*, as shown in the FIG. 7A embodiment. Accordingly, the illustrated waveguide ports 600*a* and 600*b* can direct signals (e.g., RHC and LHC polarized signals as provided herein) from a waveguide assembly into a stacked LNB such as the LNB shown in FIGS. 7–9 herein, although such LNB is provided for illustration and not limitation. As shown in FIG. 7B, LNB 700 can include a single output port 790 that can be configured to accept a signal upon which two frequency band signals may be simultaneously provided as output of the LNB 700. In one embodiment, the cable can be a coaxial cable, although other cables may be employed. Further, based on the example antenna/waveguide embodiment provided herein, the two signals (first and second LNB input signals) provided to the LNB 700 may be representative of a RHC and LHC polarized signal that can be in the approximate range of about 12.2 GHz to about 12.7 GHz. In one embodiment, these input signals can be on the order of about −87 dBm to about −70 dBm, although such example is provided merely for illustration. Continuing with the exemplary embodiment, the two (or more) LNB output signals, which can be understood to be an IF Frequency based on the LNB input signals, can include two frequency bands, where one of such output signals may be within a first frequency band that includes an approximate frequency of about 950 MHz to about 1450 MHz, while a second output signal may within a second frequency band that includes an approximate frequency of about 1525 MHz to about 2025 MHz.

Low noise block 700 may utilize a reduced height waveguide to microstrip transition that can be on the order of about one-quarter wavelength of the respective input signals to the LNB 700. Further, as shown at least in FIGS. 7B and 7C, the LNB housing can include edges 710 that may be chamfered to accommodate a tilting of an antenna (and the housing) in areas in which space may be limited.

Figure 8:
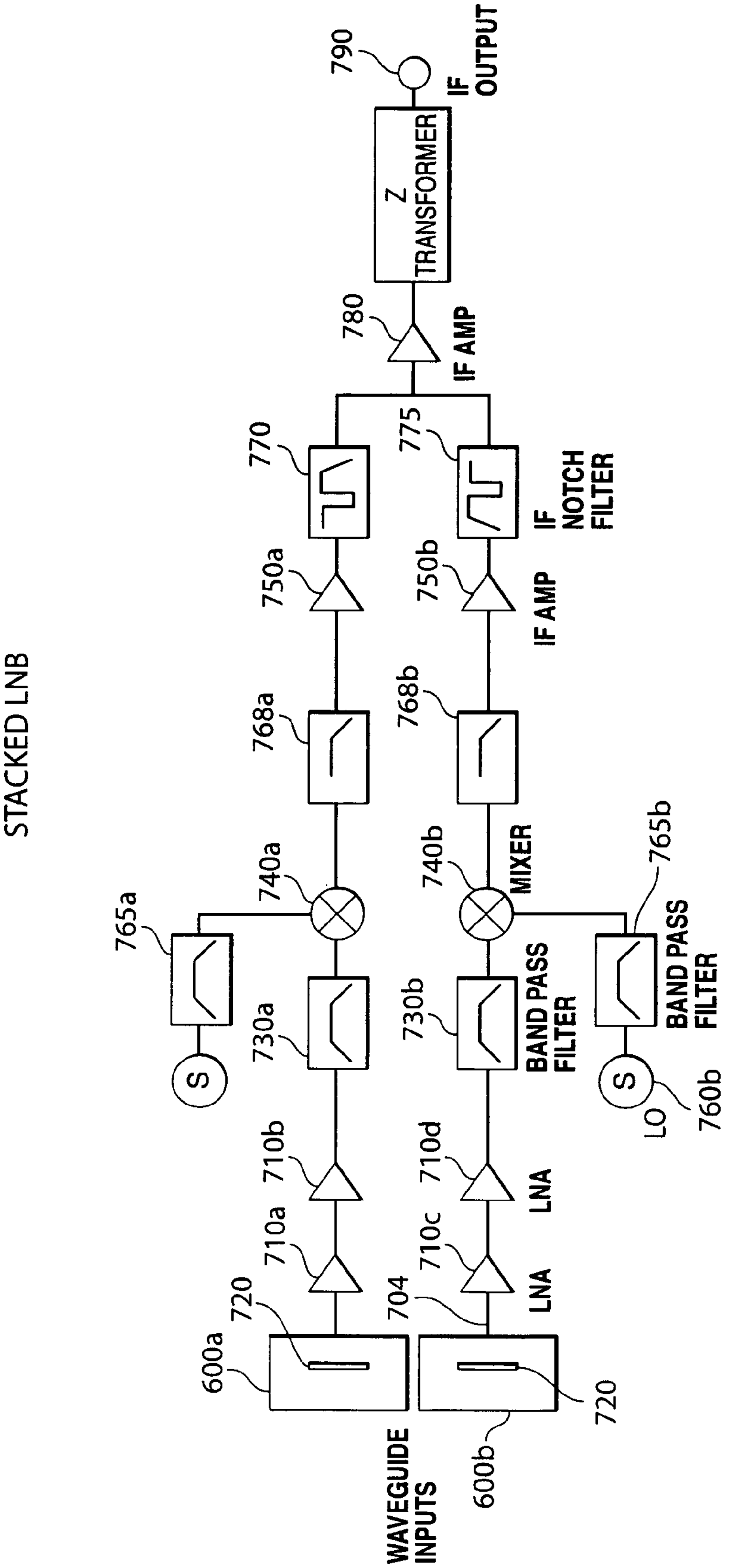

As provided herein, LNB 700 may thus be understood to downconvert signals such as right and left hand polarized signals received from a waveguide assembly such as the waveguide assembly presented herein, but also, from other waveguide assemblies. Accordingly, as shown in FIG. 8, LNB 700 can include a first and a distinct second waveguide port 600*a*, 600*b* that each comprise at least one probe 720. As provided previously herein, the probe can be configured to be approximately one-quarter wavelength from aforementioned waveguide slots 500*a,b*. Accordingly, the LNB 700 of FIG. 8 can receive the first input signal on a first signal channel 702 and a distinct second input signal on a second signal channel 704, amplify the respective input signals using one or more amplifiers 710*a–d* which can include low noise amplifiers, band-pass filter 730*a–b* such amplified signals, and downconvert the signals to an intermediate frequency (IF) using a respective local oscillator 760*a–b* and a mixer 740*a–b*. For example, in one embodiment, a first local oscillator can be tuned to a frequency of about 10.675 GHz, and a second local oscillator can be tuned to a frequency of about 11.250 GHz. Such frequencies can vary based on the embodiment.

The outputs of the mixers 740*a–b* can be filtered using one or more low pass filters 768*a–b*, whereupon the filtered signals can be amplified 750*a–b* and applied respectively to an IF notch filter 770, 775. Accordingly, FIG. 8 shows a first notch filter 770 in the first signal channel 702 and a second notch filter 775 in the second signal channel 704. It can be understood that the use of first and second, throughout the present disclosure, is merely for convenience, and for illustration and not for limitation, and accordingly, first and second can be interchanged.

In one embodiment, the first notch filter 770 can be tuned and/or centered to a frequency substantially about a range that can include the IF frequency range of the second signal channel 704, or the second output frequency. Further, the second notch filter 775 can be tuned and/or centered to a frequency substantially about a range that can include the IF frequency range of the first signal channel 702, or the first output frequency. Accordingly, such notch filters 770, 775 can be configured to eliminate interference between the first and second IF/output signals on the two communications links 702, 704, such that the first and second signals can thereafter be coupled to a common signal path/output, as shown in FIG. 8 and previously described herein as an interface to a single cable such as a coaxial cable. As also shown in FIG. 8, the coupled signals be provided to and/or the common signal path can include an IF amplifier 780 and an impedance transformer 790.

It can be understood that many of the aforementioned and/or illustrated components of the FIG. 8 LNB are optional, such as, for example, bandpass filters 765*a,b* coupled between the local oscillators 760*a,b* and the mixers 740*a,b*. Accordingly, coupling of the first and second waveguide port to the first and second notch filters, and thereafter the coupling to the common signal path/output, can be performed using a variety of hardware and/or software components which can be further coupled therein, using more and/or less thereof than may be shown in FIG. 8.

In one embodiment where the first and second output signals may be in an approximate frequency range of about 950 MHz to about 1450 MHz, and approximately about 1525 MHz to 2025 MHz, respectively, the respective notch filters 770, 775 can include a rejection of at least approximately 18 dB in the frequency ranges between 1440 MHz to 1450 MHz, and 1525 MHz to 1535 MHz. Such attenuation can be understood to reduce interference between the first and second signals (e.g., IF components of RHC, LHC, or vice-versa), as provided previously herein, such that the coupling of the first and second output signals to a common interface/output port can be performed with reduced interference. As further provided herein, such coupling to a common interface can allow for simultaneous transmission of the first and second output signals along the common interface.

While specific embodiments of the subject invention have been discussed, the above specification is illustrative and not restrictive. Many variations of the invention will become apparent to those skilled in the art upon review of this specification. For example, although the LNB is presented herein as interfacing to the antenna and waveguide shown in FIGS. 1–6, it can be fully appreciated that the disclosed LNB can be interfaced to a multitude of different antenna and/or waveguide configurations. Accordingly, the full scope of the invention should be determined by reference to the claims, along with their full scope of equivalents, and the specification, along with such variations.

Unless otherwise indicated, all numbers expressing quantities of parameters, descriptive features and so forth used in the specification and claims are to be understood as being modified in all instances by the term "about." Accordingly, unless indicated to the contrary, the numerical parameters set forth in this specification and attached claims are approximations that may vary depending upon the desired properties sought to be obtained by the present disclosure.

Elements, component, modules, and/or parts thereof that are described and/or otherwise portrayed through the figures to communicate with, be associated with, and/or be based on something else, can be understood to so communicate, be associated with, and/or be based on in a direct and/or indirect manner, unless otherwise stipulated herein.

All publications and patents mentioned herein, including those items listed below, are hereby incorporated by reference in their entirety as if each individual publication or patent was specifically and individually indicated to be incorporated by reference. In case of conflict, the present application, including any definitions herein, will control.

Also incorporated by reference are the following patents and patent applications: U.S. Ser. Nos. 10/290,667, 10/290,666, U.S. Pat. No. 6,297,774, and U.S. Pat. No. 6,512,431.

What is claimed is:

1. A device comprising:

an output for providing at least a first output signal at a first frequency band and a distinct second output signal at a distinct second frequency band, a first signal channel connected between a first waveguide port and the output, the first waveguide port providing a first input signal upon which the first output signal is based, and, a distinct second signal channel connected between a second waveguide port and the output, the second waveguide port providing a second input signal upon which the second output signal is based, where the first signal channel includes a notch filter centered substantially at about the distinct second frequency band, and the second signal channel includes a notch filter centered substantially at about the first frequency band.

2. The device of claim 1, where:

the first signal channel includes a first mixer, the first mixer coupled to a first local oscillator and the first input signal, and, the distinct second signal channel includes a distinct second mixer, the distinct second mixer coupled to a distinct second local oscillator and the distinct second input signal.

3. The device of claim 2, where the first signal channel includes at least one first low pass filter coupled to the output of the first mixer, and where the distinct second signal channel includes at least one second low pass filter coupled to the output of the distinct second mixer.

4. The device of claim 3, further comprising at least one IF amplifier coupled to said at least one first low pass filter, and at least one second IF amplifier coupled to said at least one second low pass filter.

5. The device of claim 2, further comprising a first band-pass filter coupled between the first input signal and the first mixer, and a second band-pass filter coupled between the distinct second input signal and the distinct second mixer.

6. The device of claim 2, further comprising a first band-pass filter coupled between the first local oscillator and the first mixer, and a second band-pass filter coupled between the distinct second local oscillator and the distinct second mixer.

7. The device of claim 2, where the first local oscillator is tuned to a frequency of about 10.675 GHz and the distinct second local oscillator is tuned to a frequency of about 11.250 GHz.

8. The device of claim 2, where the distinct second local oscillator is tuned to a frequency of about 10.675 GHz and the first local oscillator is tuned to a frequency of about 11.250 GHz.

9. The device of claim 1, further comprising an impedance transformer coupled to the output.

10. The device of claim 1, where the first output signal includes a maximum peak signal at a frequency in a range substantially between about 950 MHz to about 1450 MHz, and the distinct second output signal includes a maximum peak signal at a frequency in a range substantially between about 1525 MHz to about 2025 MHz.

11. The device of claim 1, wherein at least one of the first waveguide port and the second waveguide port are rectangular.

12. The device of claim 1, wherein the output comprises a coaxial cable.

13. The device of claim 1, where the first input signal represents a right-hand polarized signal, and the distinct second input signal represents a left-hand polarized signal.

14. The device of claim 1, where the first input signal represents a left-hand polarized signal, and the distinct second input signal represents a right-hand polarized signal.

15. The device of claim 1, where the first waveguide port and the distinct second waveguide port are coupled to a housing, the housing comprising chamfered edges.

16. The device of claim 1, where the first waveguide port includes a first waveguide port probe, said first waveguide port probe positioned to be a distance from an end of a waveguide of approximately one-quarter wavelength of the first input frequency.

17. The device of claim 1, where the second waveguide port includes a second waveguide port probe, said second waveguide port probe positioned to be a distance from an end of a waveguide of approximately one-quarter wavelength of the distinct second input frequency.

18. The device of claim 1, where the first output signal is approximately within a range of about 950 MHz to about 1450 MHz, and the distinct second output signal is approximately within a range of about 1525 MHz to about 2025 MHz.

19. The device of claim 1, where the distinct second output signal is approximately within a range of about 950 MHz to about 1450 MHz, and the first output signal is approximately within a range of about 1525 MHz to about 2025 MHz.

20. The device of claim 1, where the first input signal includes an approximate frequency range of about 12.2 GHz to about 12.7 GHz.

21. The device of claim 1, where the distinct second input signal includes an approximate frequency range of about 12.2 GHz to about 12.7 GHz.

22. The device of claim 1, where the first output signal is an Intermediate Frequency (IF) of the first input signal.

23. The device of claim 1, where the distinct second output signal is an Intermediate Frequency (IF) of the distinct second input signal.

* * * * *